Patented June 3, 1952

2,599,432

UNITED STATES PATENT OFFICE 2,599,432

TETRACHLOROTHIOLANE AND METHOD FOR PREPARING THE SAME

Philip D. Caesar, Champaign, Ill., assignor to Socony-Vacuum Oil Company, Incorporated, a corporation of New York No Drawing. Application November 13, 1948, Serial No. 59,973

9 Claims. (Cl. 260—332.5)

This invention relates to a new composition of matter and, more particularly, is directed to a new chemical compound, namely, tetrachlorothiolane, and to a method for producing the same.

The direct reaction between thiophene and chlorine is well known in the art and proceeds easily and rapidly under normal conditions to yield a thiophene-halogen reaction mixture comprising unreacted thiophene, monochlorothiophene, dichlorothiophene, trichlorothiophene, tetrachlorothiophene, and addition products of thiophene.

To obtain a clear-cut separation of the various chlorothiophenes, the method developed over sixty years ago and accredited to Victor Meyer has heretofore generally been employed. This method involves heating the crude chlorination reaction mixture with alcoholic potassium hydroxide for several hours, followed by addition of water and subsequent steam distillation and fractionation of the mixture so obtained to yield the various chlorothiophenes. The aforesaid treatment with alcoholic potassium hydroxide has heretofore destroyed the addition products of thiophene formed during the course of the chlorination reaction.

In accordance with the present invention, it has now been discovered that a new and useful chemical can be isolated from the reaction mixture of thiophene and chlorine. This new compound has been identified as tetrachlorothiolane and is produced in accordance with the method of this invention by treating thiophene under controlled conditions of temperature with less than 4 moles of chlorine per mole of thiophene and thereafter chilling the resulting reaction mixture to yield crystals of tetrachlorothiolane. The new compound is characterized by the structural formula:

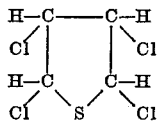

This compound may be viewed as a product of the addition of chlorine to the two double bonds of thiophene. It is prepared by the procedure described herein, upon chlorination of thiophene with less than 4 moles of chlorine per mole of thiophene and thereafter removing tetrachlorothiolane by crystallization thereof from the resulting reaction product liquid.

The molar ratio of chlorine to thiophene employed in the present process will be between about 0.5 and about 3. As will be shown hereinafter the use of smaller amounts of chlorine results in extremely low yields of the desired compound, while the presence of an excess of chlorine, that is, 4 moles of chlorine per mole of thiophene or greater amounts, gives rise to a reaction product mixture from which no tetrachlorothiolane is isolated. It is, accordingly, an essential feature of the present process that an excessive amount of chlorine be avoided. Under the usual operating conditions, the amount of chlorine employed will be between about 1 and about 3 moles of chlorine per mole of thiophene. Particular preference is accorded a molar ratio of chlorine to thiophene of about 2.

While the temperature at which chlorination is effected may extend from —30° C. to about 100° C., the preferred temperature range will generally be between about 0° C. and about 50° C. As a practical matter, it appears that the lower the temperature of chlorination, the greater is the yield of chlorinated mixture obtained. However, the overall yield of desired tetrachlorothiolane is a maximum when chlorination is effected at a temperature between about 0° C. and about 50° C., and particularly in the range of about 20° C. to about 30° C. It has been found that tetrachlorothiolane can be separated with a minimum of difficulty from the mixture resulting upon chlorination of thiophene in the aforementioned preferred temperature range.

At the completion of chlorination, the resulting reaction product mixture is cooled to a temperature below 0° C. and preferably in the range of —30° C. to —70° C., at which crystallization of tetrachlorothiophene takes place. The separation of tetrachlorothiolane by crystallization from the reaction product liquid is facilitated by the use of a solvent such as petroleum ether. While the use of such solvent is not absolutely necessary, it is desirable, particularly when the molar ratio of chlorine to thiophene is between about 2 and about 3, since the speed at which crystallization of the tetrachlorothiolane occurs is thereby perceptibly increased. The resulting crystals of tetrachlorothiolane are then separated by filtration, centrifuging or other suitable means.

The new compound of this invention is a white crystalline solid with a melting point of 111.5–113.5° C. The compound contains reactive chlorine capable of entering into a number of different chemical reactions and may serve as an intermediate in chemical synthesis of compounds suitable for use in the pharmaceutical, dye, and allied industries. Composition of the new compound was established by the following analysis:

|  | Found | Calc. for $C_4H_4Cl_4S$ |
| --- | --- | --- |
| Carbon | 21.27 | 21.26 |
| Hydrogen | 1.78 | 1.79 |
| Chlorine | 62.5 | 62.76 |
| Sulfur | 14.8 | 14.19 |

The fact that tetrachlorothiolane was formed from thiophene and was converted upon treatment with alcoholic potassium hydroxide into the four different dichlorothiophenes established the ring structure. An infra-red absorption spectra of a saturated solution of the compound in carbon tetrachloride showed no evidence of unsaturation characteristic of the thiophene nucleus and no olefinic bonds. The boiling point of the compound was 111.5° C. at 3.4 millimeters of mercury. The molecular weight as determined by the ebullioscopic method was 225 as compared with a calculated value of 225.6.

The following examples will serve to illustrate the process of this invention without limiting the same:

*Example 1*

Thirty-five hundred grams of thiophene were chlorinated at a temperature of 30–40° C. The chlorine was added over a period of about 13 hours until the total weight was 5307 grams. The reaction mixture was cooled to yield a white crystalline precipitate. The crystals so obtained were filtered from the liquid reaction product and were found to have a melting point of 103–111° C. Purification was effected by recrystallization from ASTM naphtha-carbon tetrachloride or from benzene-petroleum ether. This gave a product which was identified as tetrachlorothiolane, having a melting point of 111.5–113.5° C.

*Example 2*

Thiophene was reacted with an equimolar amount of chlorine. The temperature of the reaction mixture was maintained at 38–55° C. by cooling. One hundred thirty-five and one-quarter pounds of the resulting chlorinated mixture were kept at —29° C. for a period of about 17 hours. The reaction mixture was thereafter filtered to yield 12.75 pounds of crystalline tetrachlorothiolane.

*Example 3*

Five moles of thiophene (420 grams) were reacted with 10 moles of chlorine. The temperature of the mixture was kept at —30° C. during the reaction by external cooling. The weight of the chlorinated mixture was 920 grams. The mixture was cooled to —70° C., where crystallization occurred. The mixture was filtered to yield 43 grams of a crystalline product which was identified as tetrachlorothiolane.

*Example 4*

Five moles of thiophene (420 grams) were reacted with 10 moles of chlorine. The reaction mixture was maintained at 65–80° C. during the chlorination by external cooling. The weight of the chlorinated mixture was 847 grams. The mixture was cooled to —70° C., where crystallization occurred. The mixture was filtered to yield 40 grams of a product which was identified as tetrachlorothiolane.

*Example 5*

Six and two-tenths moles of thiophene (520 grams) were reacted with 5 moles of chlorine. The reaction mixture temperature was maintained at 20–30° C. during the chlorination by external cooling. The weight of the chlorinated mixture was 745 grams. The mixture was then chilled to —70° C. and maintained at this temperature for a period of 4 hours. The resulting white crystalline product was filtered from the liquid reaction mixture to yield 74 grams of tetrachlorothiolane.

Examples 6 to 10, as set forth in the table below, were run under comparable conditions to determine the effect of the degree of chlorination on the yield of tetrachlorothiolane. In each instance, 5 moles of thiophene were chlorinated at a temperature of 20–30° C. and the resulting reaction mixture was kept at —70° C. for 4 hours and thereafter filtered to obtain crystalline tetrachlorothiolane.

| Example | Mole Chlorine per Mole Thiophene | Weight Reaction Mixture (grams) | Tetrachlorothiolane (grams) | Product Weight Per cent | Yield Per cent Based on Thiophene |
| --- | --- | --- | --- | --- | --- |
| 6 | 0.5 | 531 | 28 | 5.3 | 2.5 |
| 7 | 1.0 | 642 | 63 | 9.8 | 5.6 |
| 8 | 2.0 | 884 | 93 | 10.5 | 8.2 |
| 9 | 3.0 | 1,065 | 32 | 3.0 | 2.8 |
| 10 | 4.0 | 1,331 | 0 | | |

It will be noted from the above table that the molar ratio of chlorine to thiophene is an important factor in the process of this invention. Thus, it will be seen from Example 10 that when the molar ratio of chlorine to thiophene was 4, no tetrachlorothiolane could be obtained. It is to be further noted that the yield of desired compound was almost the same when the molar ratio of chlorine to thiophene was 0.5 as it was when the molar ratio was 3. The maximum yields of tetrachlorothiolane, however, were realized when the molar ratio of chlorine to thiophene was in the range of 1–2. It is to be further noted from the above examples, particularly Examples 3, 4, and 8, that as the temperature of chlorination was reduced from 65–80° C. to about —30° C., the amount of chlorinated reaction product obtained increased. However, it will be seen that, while the amount of chlorinated reaction product obtained in Example 3 was greater than that obtained in either Examples 4 or 8, the overall yield of tetrachlorothiolane was greatest in Example 8, wherein the chlorination of thiophene was effected at a temperature of 20–30° C. Accordingly, chlorination in this latter temperature range is a preferred embodiment of the present invention.

I claim:

1. A method for preparing tetrachlorothiolane, comprising reacting thiophene with less than 4 moles of chlorine per mole of thiophene and thereafter cooling the resulting reaction product liquid to a temperature at which crystallization takes place and removing the crystals of tetrachlorothiolane so obtained.

2. A method for preparing tetrachlorothiolane, comprising reacting thiophene with between about 0.5 and about 3 moles of chlorine per mole of thiophene and thereafter cooling the resulting reaction product liquid to a temperature at which crystallization takes place and removing the crystals of tetrachlorothiolane so obtained.

3. A method for preparing tetrachlorothiolane, comprising reacting thiophene with between about 0.5 and about 3 moles of chlorine per mole of thiophene at a temperature in the range of about 0° C. to about 50° C. and thereafter cooling the resulting reaction product liquid to a temperature at which crystallization takes place and removing the crystals of tetrachlorothiolane so obtained.

4. A method for preparing tetrachlorothiolane, comprising reacting thiophene with between about 0.5 and about 3 moles of chlorine per mole of thiophene at a temperature between about 20° C. and about 30° C. and thereafter cooling the resulting reaction product liquid to a temperature at which crystallization takes place and removing the resulting crystals of tetrachlorothiolane by filtration.

5. A method for preparing tetrachlorothiolane, comprising reacting thiophene with between about 1 and about 3 moles of chlorine per mole of thiophene at a temperature in the range of about 0° C. to about 50° C., adding an inert organic solvent to the reaction product liquid so treated, cooling to a temperature at which crystallization takes place and removing the resulting crystals of tetrachlorothiolane so obtained.

6. A method for preparing tetrachlorothiolane, comprising reacting thiophene with about 2 moles of chlorine per mole of thiophene at a temperature between about 20° C. and about 30° C., adding petroleum ether to the reaction product liquid so treated, cooling to a temperature at which crystallization takes place and removing the resulting crystals of tetrachlorothiolane.

7. A method for preparing tetrachlorothiolane, comprising reacting thiophene with between about 0.5 and about 3 moles of chlorine per mole of thiophene and chilling the resulting reaction product liquid to a temperature below 0° C., thereby effecting crystallization of tetrachlorothiolane.

8. A method for preparing tetrachlorothiolane, comprising reacting thiophene with between about 0.5 and about 3 moles of chlorine per mole of thiophene at a temperature in the range of about 0° C. to about 50° C. and chilling the resulting reaction product liquid to a temperature of from −30° C. to −70° C., thereby effecting crystallization of tetrachlorothiolane.

9. 2,3,4,5-tetrachlorothiolane having the formula:

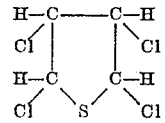

and having a melting point of about 112° C. within a range of about 2° C.

PHILIP D. CAESAR.

REFERENCES CITED

The following references are of record in the file of this patent:

Steinkopf, "Die Chemie des Thiophens," Dresden, 1941, pp. 35 and 38.